UNITED STATES PATENT OFFICE.

MARY C. HORN, OF MUENSTER, TEXAS.

METHOD OF PREPARING CARROT FLAKES.

1,272,266.          Specification of Letters Patent.        Patented July 9, 1918.

No Drawing.       Application filed January 12, 1918.    Serial No. 211,615.

*To all whom it may concern:*

Be it known that I, MARY C. HORN, a citizen of the United States of America, residing at Muenster, in the county of Cooke and State of Texas, have invented new and useful Improvements in Methods of Preparing Carrot Flakes, of which the following is a specification.

The invention has reference generally to improvements in that class of inventions known as preservatives and more particularly relates to a method of preparing carrot flakes.

It is the primary aim and object of the present invention to provide a method of the above character wherein carrots may be preserved in the form of flakes so as to retain their flavor and color when subsequently cooked and served.

In carrying out the present method or process, the carrots are first peeled and washed, being allowed to drain in a colander or the like. The carrots are now sliced by a vegetable slicer or a vegetable slicing machine and again washed and measured. Next, to every quart of sliced carrots one quart of water is added and the sliced carrots and water are boiled together until all of the water has evaporated. During this boiling action care must be taken not to burn or scorch the carrots. The sliced carrots are now dried and this is accomplished preferably by placing the carrots on a piece of material such as cheese cloth and placing the cheese cloth with the carrots thereon in a drier and subjecting the same to a heat of 135° to 140° F. for about two and one-half hours. The sliced carrots which have now become partially dried are placed on a pastry board and rolled into a flattened flake-like form or else this is accomplished by placing the sliced carrots in a rolling machine. It is to be understood, of course, that the manner of rolling depends on whether the flakes are being prepared at home or in a factory. Subsequent to rolling or flattening the carrot flakes they are again placed on the cheese cloth in the drier so as to be finally dried and this action requires about one hour. However, it is to be appreciated that the thinner the carrot flakes the less time it consumes to finally dry them. During the final drying of the carrot flakes the latter are agitated or stirred in any convenient manner to assure of an effective drying.

The carrot flakes prepared in the foregoing manner may be placed in packages and sold and are particularly adapted for use in soups or when cooked with other vegetables. They may also be served by themselves requiring only to be seasoned and boiled in water about five minutes.

It is believed in view of the foregoing description of the improved method that a further description thereof is entirely unnecessary. Likewise it is believed that the commercial advantages of the invention will be readily apparent.

Having thus fully described the invention what is claimed and desired to be secured by Letters Patent is:—

1. The herein described method of preparing carrot flakes consisting of peeling, washing and slicing the carrots, then boiling the sliced carrots in a quantity of water until the water has entirely evaporated, then partially drying the sliced carrots and subsequently rolling them into a flattened flake-like form and finally drying the sliced carrots.

2. The herein described method of preparing carrot flakes consisting in peeling and washing and slicing the carrots and boiling the sliced carrots in water until all of the water has entirely evaporated and finally rolling the carrots into a flattened flake-like form and drying them.

3. The herein described method of preparing carrot flakes consisting in first peeling and washing the carrots, then slicing the carrots and again washing them, then adding one quart of water to each quart of sliced carrots and boiling the mixture until all of the water has entirely evaporated, then placing the sliced carrots in a drier on a piece of cheese cloth and subjecting the carrots to a temperature of approximately 135° for about two and one-half hours to partially dry the sliced carrots, then rolling the sliced carrots into a flattened flake like form and finally placing the carrots in the drier for approximately one hour to complete the drying thereof.

In testimony whereof I affix my signature.

MARY C. HORN.